(12) United States Patent
Albach et al.

(10) Patent No.: US 10,677,281 B2
(45) Date of Patent: Jun. 9, 2020

(54) FASTENING ELEMENT, ARRANGEMENT COMPRISING A FASTENING ELEMENT, AND METHOD FOR INSTALLING A FASTENING ELEMENT

(71) Applicant: NEWFREY LLC, New Britain, CT (US)

(72) Inventors: Jens Albach, Giessen (DE); Frank Rosemann, Giessen (DE); Anton Konstanz, Giessen (DE)

(73) Assignee: NEWFREY LLC, New Britain, CT (US)

( * ) Notice: Subject to any disclaimer, the term of this patent is extended or adjusted under 35 U.S.C. 154(b) by 50 days.

(21) Appl. No.: 15/850,030

(22) Filed: Dec. 21, 2017

(65) Prior Publication Data
US 2018/0172057 A1  Jun. 21, 2018

(30) Foreign Application Priority Data

Dec. 21, 2016 (EP) ..................................... 16205905

(51) Int. Cl.
| | | |
|---|---|---|
| *F16B 37/16* | (2006.01) | |
| *F16B 37/08* | (2006.01) | |
| *F16B 39/10* | (2006.01) | |
| *F16B 21/04* | (2006.01) | |

(52) U.S. Cl.
CPC .......... *F16B 37/16* (2013.01); *F16B 37/0842* (2013.01); *F16B 37/0857* (2013.01); *F16B 39/10* (2013.01); *F16B 21/04* (2013.01)

(58) Field of Classification Search
CPC .. F16B 37/16; F16B 37/0842; F16B 37/0857; F16B 39/10; F16B 21/04
See application file for complete search history.

(56) References Cited

U.S. PATENT DOCUMENTS

| | | | |
|---|---|---|---|
| 2008/0044255 A1* | 2/2008 | Rosemann | ............ F16B 5/0628 411/508 |
| 2008/0181748 A1* | 7/2008 | Rosemann | .......... F16B 37/0857 411/431 |

FOREIGN PATENT DOCUMENTS

JP          2013-061036 A          4/2013

* cited by examiner

*Primary Examiner* — John C Hong
(74) *Attorney, Agent, or Firm* — Michael P. Leary; Kofi A. Schulterbrandt

(57) ABSTRACT

A fastening element operable for securing to a shank of a bolt-like element, the fastening element comprising an engaging part and a head part. The engaging part, comprises a longitudinally extending bush and an engaging body that projects radially inward. The bush and the engaging body partially define a receptacle in which the shank of the bolt-like element can be received. The head part is arranged above the engaging part and comprises a main body and a supporting portion. The head part is movably engaged with the engaging part by a bayonet catch and can be moved between a free position and a locked position, and, when in the locked position, the supporting portion covers the engaging body and blocks the engaging body from moving in translation along the longitudinal axis.

11 Claims, 3 Drawing Sheets

FASTENING ELEMENT, ARRANGEMENT COMPRISING A FASTENING ELEMENT, AND METHOD FOR INSTALLING A FASTENING ELEMENT

CROSS-REFERENCE TO RELATED APPLICATION

This application claims priority from European Patent Application No. 16205905.9, filed on Dec. 21, 2016, the disclosure of which is incorporated herein by reference.

BACKGROUND OF THE INVENTION

The present invention relates to a fastening element that can interact with a bolt.

The present invention further relates to an arrangement comprising a fastening element, and to a method for installing a fastening element of this type.

Fastening elements are used frequently and for various applications in the automobile industry, for example. There are various requirements for all applications. For example, fastening elements that have a height of from 1 mm to 9 mm when assembled with a plurality of components are required for underbodies or wheel housing shells. Screw solutions e.g. comprising nuts could fulfil this requirement. Unfortunately, screw solutions of this type are very disadvantageous for reasons of production cycle time.

JP2013-061036A discloses a fastening element that can interact with a bolt. The fastening element comprises an inner part and an outer part. The inner part comprises a locking finger that clamps into the thread of a bolt. The outer part is placed over the inner part of the bolt receptacle. Fastening elements of this type are complex to produce. Furthermore, fastening elements of this type are sometimes difficult to implement in arrangements having variable parameters such as length, workpiece thickness, number of workpieces etc.

The object of the present invention is therefore to specify an improved fastening element that preferably permits better assembly flexibility with low assembly forces and high disconnection forces.

SUMMARY OF THE INVENTION

The above-mentioned object is achieved by a fastening element according to claim 1, by an arrangement according to either claim 9 or claim 10, and by a method for installing the fastening element according to claim 11.

The fastening element according to the invention comprises the following features: an engaging part that comprises a bush and an engaging body that projects from the bush, the bush extending along a longitudinal axis, the engaging body projecting in the direction of the longitudinal axis, and the bush and the engaging body forming a receptacle in which a shank of a bolt-like element can be received; and a head part that is arranged above the engaging part, the head part comprising a main body and a supporting portion, the head part and engaging part being able to be moved relative to one another by a bayonet catch between a free position and a locked position, and, in the locked position, the supporting portion covering the engaging body and blocking the engaging body from moving in translation along the longitudinal axis.

The fastening element according to the invention permits secure fastening without a screw solution, and having low assembly forces and high disconnection forces. For example, the fastening element according to the invention can be assembled without a tool, without reducing the clamping quality.

According to a further preferred embodiment, the head part comprises a projection and the bush of the engaging part comprises a slot. The projection and the slot form the bayonet catch. The interlocking connection of the bayonet catch is produced in a simple manner.

In a preferred embodiment, the main body comprises a groove that receives the bush in part. This feature allows a better connection between the engaging part and the head part.

In a further preferred embodiment, the head part comprises a gripping portion that provides a cross-sectional enlargement relative to the main body. The gripping portion ensures tool-free assembly.

In a particularly preferred embodiment, the supporting portion is circular. The supporting portion can form a ring having interruptions. This ensures better distribution of pressure.

In a particularly preferred embodiment, the bush extends along the longitudinal axis between a first end portion and a second end portion, and the engaging body is connected to the first end portion. This ensures a space-saving design.

In a particularly preferred embodiment, the bush extends along the longitudinal axis between a first end portion and a second end portion, the engaging part comprising a flange, and the flange being connected to the first end portion and extending outwards from the bush. This ensures a space-saving design.

In a particularly preferred embodiment, a rubber gasket and/or fluting is provided on the flange. This prevents the engaging part from loosening easily (also due to vibrations).

SUMMARY OF THE INVENTION

Furthermore, the above object is achieved by an arrangement comprising a fastening element and a bolt-like element having a threaded shank or a shank having an undercut, the threaded shank or the undercut being received in the receptacle, and the engaging body engaging with the threads of the threaded shank or the undercut. The connection between the threaded shank and the engaging body improves fastening.

Finally, the above object is achieved by a method for installing a fastening element, comprising the steps of:
providing a fastening element, the head part and engaging part being in the free position,
providing a first workpiece having a hole,
providing a second workpiece having a connected bolt-like element that has a threaded shank or an undercut,
penetrating the hole with the bolt-like element,
arranging the fastening element on the bolt-like element,
pressing the fastening element so that the engaging body engages with the threads of the shank or with the undercut,
further pressing the fastening element onto the shank so that the head part moves, in order to set the head part and the engaging part into the locked position using the bayonet catch.

This method is simple to implement.

Of course, the above-mentioned features and the features that will be explained below can be used not only in the combination specified in each case, but also in other combinations or individually, without departing from the scope of the present invention.

BRIEF DESCRIPTION OF THE SEVERAL VIEWS OF THE DRAWINGS

Embodiments of the invention are shown in the drawings and are explained in greater detail in the following description. In the drawings.

DETAILED DESCRIPTION OF THE PREFERRED EMBODIMENTS

Figure 1:
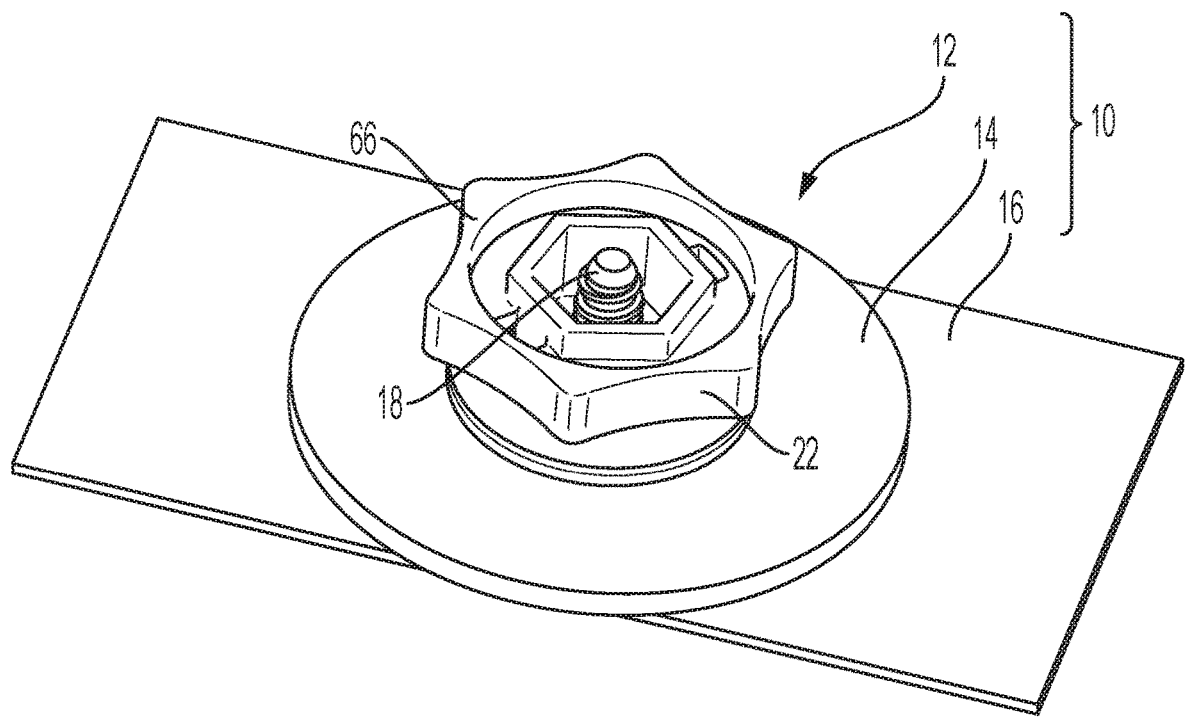
FIG. 1 is a perspective view of a preferred embodiment of an arrangement according to the invention comprising a fastening element, a first workpiece and a bolt-like element.

FIG. 1 shows an arrangement 10 comprising a fastening element 12, a first workpiece 14, a second workpiece 16 and a bolt-like element 18.

Figure 2:
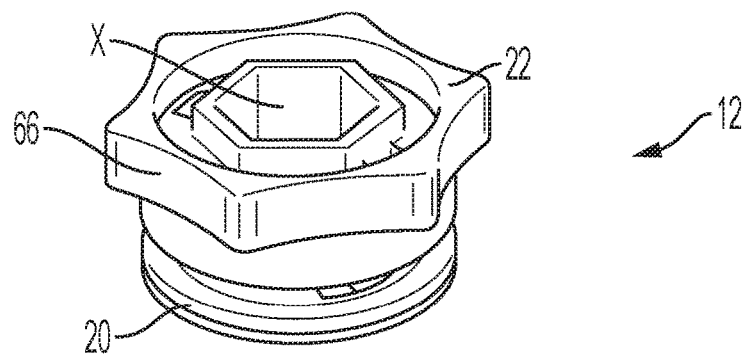
FIG. 2 is a perspective view of the fastening element of FIG. 1 comprising an engaging part and a head part.
Figure 3:
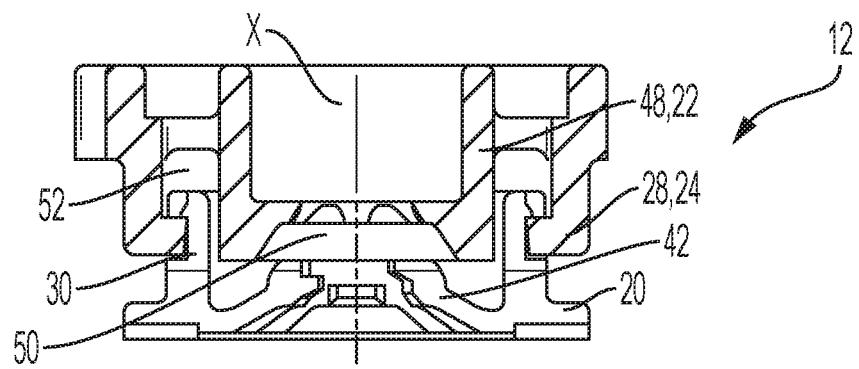
FIG. 3 is a sectional view of the fastening element of FIG. 2.

The fastening element 12, as shown in FIGS. 2 and 3, is preferably formed in two parts and comprises an engaging part 20 and a head part 22. The engaging part 20 and the head part 22 can be interconnected and can be moved relative to one another between a free position and a locked position. The movement between the free position and the locked position is made possible by a bayonet catch 24. In the locked position, the head part 22 is secured against rotation and displacement relative to the engaging part 20. In the free position, the head part 22 can be displaced and/or can rotate relative to the engaging part 20. FIG. 3 shows the engaging part 20 and the head part 22 in the free position. The bayonet catch 24 is formed by a slot 26 and a projection 28.

For example, the head part 22 may comprise the projection 28 and the engaging part 20 may comprise the slot 26. In another embodiment, the projection may be formed on the engaging part and the slot may be formed on the head part. The slot 26 forms a control cam for the projection. The slot has a constant or substantially constant width, for example.

Figure 4:
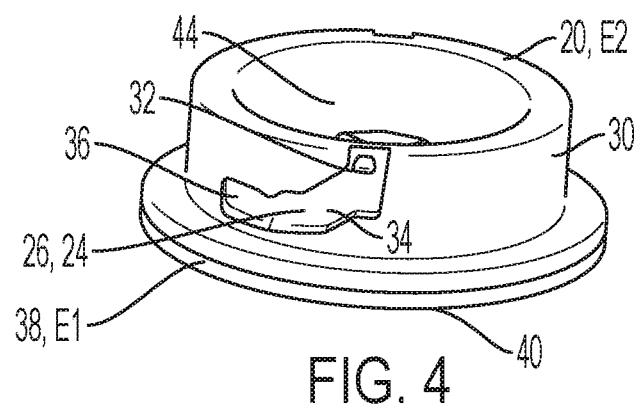
FIG. 4 is a perspective view of the engaging part of FIG. 2.

FIG. 4 shows the engaging part 20 comprising the slot 26. The engaging part 20 comprises a bush 30. The bush 30 is, for example as shown, a cylindrical bush that extends along a longitudinal axis X between a first end portion and a second end portion E1, E2. The bush 30 comprises an inner lateral face and an outer lateral face remote from the inner lateral face. The inner lateral face is oriented in the direction of the longitudinal axis X. The slot 26 is arranged on the outer lateral face, although in another embodiment the slot could be arranged on the inner lateral face.

As shown in FIG. 4, the slot 26 may comprise a first, a second and a third portion 32, 34, 36. The second portion 34 is arranged between the first and third portions 32, 36. The first 32 portion is straight and extends from the second end portion in parallel with the longitudinal axis X, for example.

The second portion 34 extends obliquely relative to the first portion, for example. The third portion 36 may extend orthogonally to the first portion. The third portion 36 is separated from the second portion 34 by an elevation, for example.

The engaging part 20 comprises a flange 38. The flange 38 is connected to the first end portion E1 and extends outwards from the bush 30. The flange 38 forms a base. The flange 38 has a first surface that faces towards the bush 30 and a second surface that faces away. A rubber gasket 40 may be arranged on the second surface. Fluting (not shown) may also be arranged there.

Figure 7:
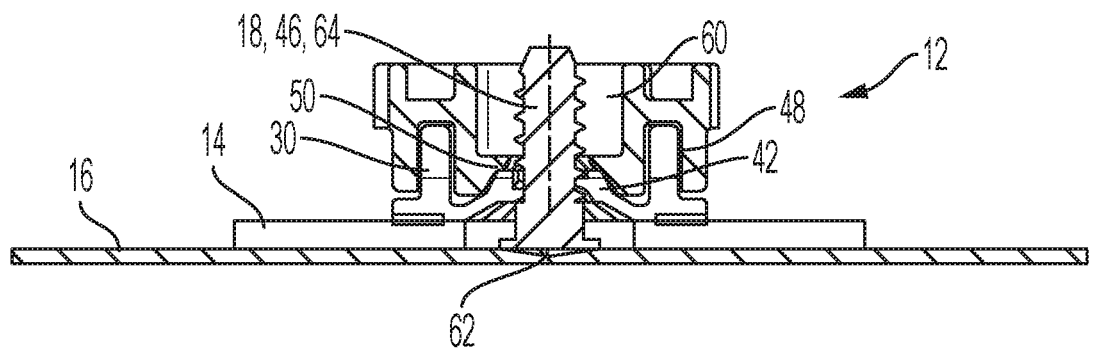
FIG. 7 is a sectional view of the arrangement of FIG. 1.
Figure 8:
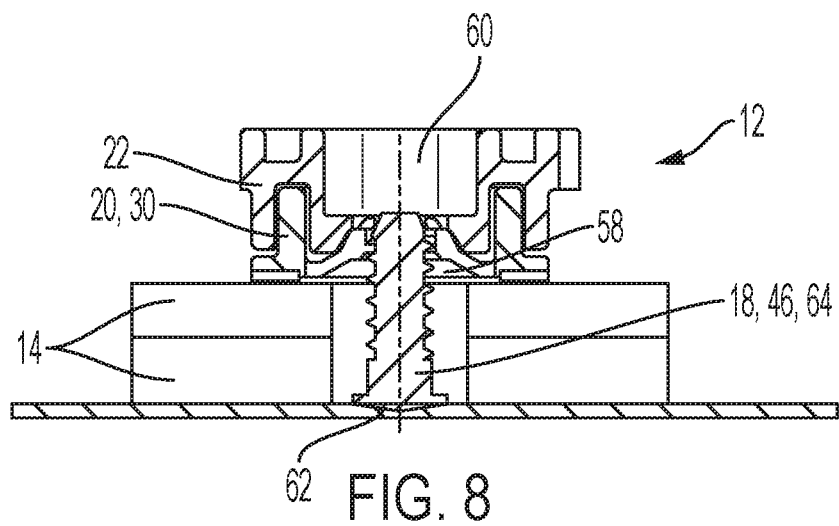
FIG. 8 is a sectional view of a further preferred embodiment of the arrangement.

Furthermore, the engaging part 20 comprises an engaging body 42. The engaging body 42 consists, for example, of one, two or more engaging fingers. The engaging body 42 may also be continuous and form an engaging collar. The engaging body 42 projects from the bush 30 in the direction of the longitudinal axis X. The engaging body 42 is connected to the inner lateral face of the bush 30. The engaging body may extend from the second end portion of the bush. As shown in FIGS. 3, 7 and 8, the engaging body 42 may also extend from the first end portion E1. The engaging body 42 forms a flexible portion that extends obliquely from the first end portion E1 in the direction of the longitudinal axis X. The engaging body 42 may also be one or more resilient tabs.

The engaging body 42 and the bush 30 form a receptacle 44 that can receive a shank 46 of a bolt-like element 18.

The engaging part 20 is connected to the head part 22 by the slot 26.

Figure 5:
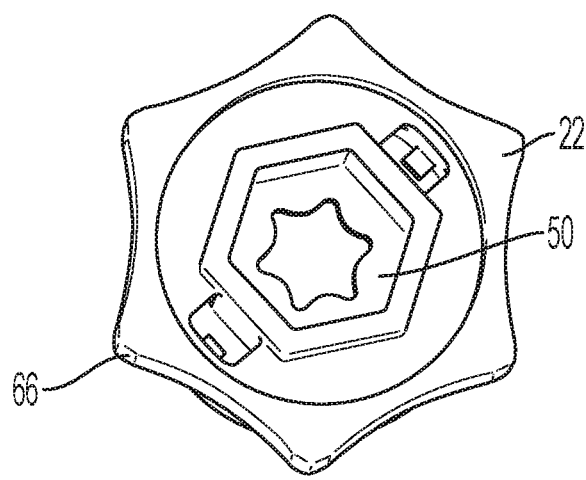
FIG. 5 is a perspective view of the head part of FIG. 2.

The head part 22 is arranged above the engaging part 20, as shown in FIGS. 1, 2, 3, 7 and 8. The head part 22 is in particular shown in FIG. 5 and FIG. 6. The head part 22 comprises a main body 48 and a supporting portion 50.

The main body 48 is tubular for example and extends along the longitudinal axis X between a first end part and a second end part. The main body 48 (or the first end part) comprises a groove 52. The groove 52 receives the bush 30 of the engaging part in part. For example, the first end portion E1 of the bush 30 extends in the groove 52. The second end part may comprise a flute.

The groove 52 comprises an inner wall, an outer wall and a transverse wall 56. The inner wall and the outer wall are fairly parallel with one another and with the longitudinal axis X, for example. The transverse wall 56 connects the inner wall and the outer wall. The transverse wall 56 forms a reinforcing portion. The transverse wall is located at three quarters of the height of the inner and outer walls of the first end part, for example.

The supporting portion 50 is connected to the inner wall, and extends in particular from an inner surface of the inner wall. The supporting portion 50 is for example circular and centred on the longitudinal axis X. The supporting portion 50 may form a ring or a collar, with or without interruptions 51. The supporting portion 50 can be seen in particular in FIG. 5 and FIG. 6. Viewed from above, the support portion 50 is star-shaped. The supporting portion 50 forms an inner open cover and is located at less than half the height of the inner and outer walls of the first end part, for example.

Figure 6:
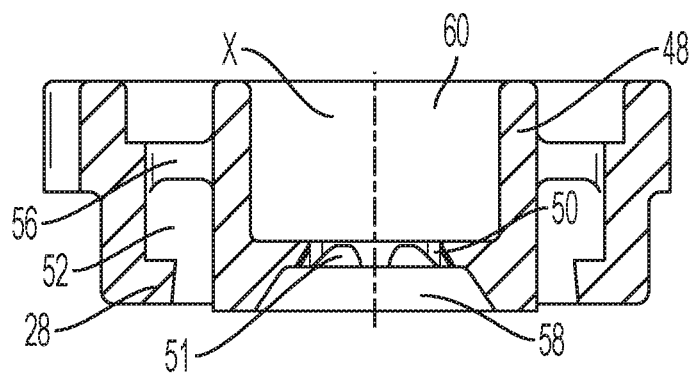
FIG. 6 is a sectional view of the head part of FIG. 5.

The supporting portion 50 covers in part the receptacle that is formed by the inner wall. The supporting portion 50 substantially divides the receptacle, formed by the inner wall, into two parts 58, 60. The two parts 58, 60 may be the same or, as shown in FIG. 6 for example, the first part 58 may have a smaller volume than the second part 60. The first part 58 can receive the engaging body 42.

The head part 22 is located above the engaging part 20, as shown in FIG. 3 or FIG. 2. In FIG. 3, the head part and the engaging part 20 are in the free position. The first part of the head part 22 receives the engaging body 42. The projection 28 of the head part 22 is in the first portion of the slot 26, for example. As shown in FIG. 3, the head part 22 may have two projections and the engaging part may have two slots; each slot interacts with a projection. The two projections (or the two slots) are arranged on the head part (or on the engaging part) so as to be diametrically opposed. In the free position, the supporting portion is either not in contact or only minimally in contact with the engaging body, such that said supporting portion does not exert any force (or exerts only negligible forces) on the engaging body.

The head part 22 is integral. The engaging part 20 is integral. The fastening element 12 comprising the head part 22 and the engaging part 20 is formed in two parts. The head part 22 and/or the engaging part 20 is made of plastics material. The head part 22 and the engaging part 20 can be connected by means of a detachable connection or a permanent connection. For example, a stop can be attached at the beginning of the first portion of the slot 26 (in the direction of the second end portion). In the free position, the projection of the head part 22 is in the first portion of the slot and cannot leave the first portion due to the stop.

The fastening element 12 comprising the head part 22 and the engaging part 20, for example the fastening element shown in FIG. 3, is used in the arrangement 10 in FIG. 1, FIG. 7 or FIG. 8. The arrangement 10 comprises the fastening element 12, the first workpiece 14, the second workpiece 16 and the bolt-like element 18.

The bolt-like element 18 is a welded bolt, for example, which is suitable for being connected to the second workpiece 16 using a welding process. The bolt-like element 18 comprises, for example, a head 62, which has a welding surface, a retaining surface that faces away from the welding surface, and a threaded shank 64.

In another embodiment, the bolt-like element may comprise a head 62, which has a welding surface and a retaining surface that faces away from the welding surface, and a shank that does not have a thread but does have an undercut.

The welding surface is welded to the second workpiece. The threaded shank 64 extends substantially orthogonally to the second workpiece 16.

As already shown in FIG. 7 and FIG. 8, the threaded shank 64 (or the shank having the undercut) is inserted into a hole in the first workpiece. The first workpiece 14 may have different thicknesses. The first workpiece 14 in FIG. 7 has a smaller thickness than the first workpiece 14 in FIG. 8, for example. The height (thickness) of the two workpieces may be between 1 and 9 millimetres (mm), for example. The first workpiece may comprise a plurality of sheets or parts. The first and/or second workpiece may be flat in portions.

The threaded shank 68 (or the shank having the undercut) projects in part from the first workpiece. The fastening element 12 is initially arranged on the projecting part of the threaded shank (or of the shank having the undercut). The threaded shank axis is aligned with the longitudinal axis X. The threaded shank 68 (or the shank having the undercut) is received in the receptacle that is formed by the bush and the engaging body. In the free position, the fastening element is substantially pressed onto the threaded shank (or the shank having the undercut) until the threaded shank 68 (or the shank having the undercut) is received in the receptacle. The engaging body then engages over the thread of the threaded shank 68 (or of the shank having the undercut).

The fastening element 12 is then further pressed until the projection arrives between the first portion of the slot and the second portion of the slot. The fastening element is then rotated until the projection arrives in the third portion of the slot and is locked. The fastening element is then in the locked position. In this position, the supporting portion 50 blocks the engaging body from moving, and in particular from moving along the longitudinal axis (or upwards, towards the second end portion E2). The supporting portion 50 covers the engaging body. The supporting portion 50 obstructs the engaging body 42, which engages over the threads of the threaded shank 64 (or over the undercut of the shank having the undercut). In order to simplify the movement of the fastening element 12, the head part may comprise a gripping portion 66 that provides a cross-sectional enlargement relative to the main body. The gripping portion 66 is connected to the outer wall. The gripping portion 66 is star-shaped for example. The gripping portion may have a polygonal cross section. The fastening element 12 can be pressed by hand or by means of a tool. The fastening element 12 can be rotated from the locked position into the free position by a standard tool for example. For example, the inner wall of the second end part has a hexagonal cross section (or another similar cross section), such that and a socket spanner can be used. The fastening element 12 is formed in the manner of a push button. The fastening element 12 is preferably long enough along the longitudinal axis X that the threaded shank 64 (or the shank having the undercut) does not project from the fastening element 12 or projects only minimally therefrom. The same fastening element 12 can be adapted to different (first) workpiece thicknesses, having the same locking forces.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A fastening element operable for securing to a shank of a bolt-like element, the fastening element comprising:
   an engaging part, which comprises a bush and an engaging body that projects from the bush, and the bush extends along a longitudinal axis, and the engaging body projects radially inward in the direction of the longitudinal axis, and wherein the bush and the engaging body partially define a receptacle in which the shank of the bolt-like element can be received;
   a head part, arranged above the engaging part, wherein the head part comprises a main body and a supporting portion; and
   wherein the head part is movably engaged with the engaging part by a bayonet catch and can be moved relative to one another between a free position and a locked position, and wherein, in the locked position, the supporting portion covers the engaging body and blocks the engaging body from moving in translation along the longitudinal axis.

2. A fastening element according to claim 1, wherein the head part comprises a projection, and wherein the bush of the engaging part comprises a slot, and wherein the bayonet catch comprises the projection and the slot.

3. A fastening element according to claim 1, wherein the main body comprises a groove that receives the bush in part.

4. A fastening element according to claim 1, wherein the head part comprises a gripping portion that provides a cross-sectional enlargement relative to the main body.

5. A fastening element according to claim 1, wherein the supporting portion is circular, and wherein the supporting portion forms a ring having interruptions.

6. A fastening element according to claim 1, wherein the bush extends along the longitudinal axis between a first end portion and a second end portion, and wherein the engaging body extends radially inward from the first end portion.

7. A fastening element according to claim 1, wherein the bush extends along the longitudinal axis between a first end portion and a second end portion, and the engaging part further comprises a flange connected to the first end portion and extending radially outwards from the bush.

8. A fastening element according to claim 7, wherein at least one of a rubber gasket and a fluting is provided on the flange.

9. An arrangement comprising:
a bolt-like element including a shank;
a fastening element comprising:
an engaging part, which comprises a bush and an engaging body that projects from the bush, and the bush extends along a longitudinal axis, and the engaging body projects radially inward in the direction of the longitudinal axis, and wherein the bush and the engaging body partially define a receptacle;
a head part arranged above the engaging part, wherein the head part comprises a main body and a supporting portion;
wherein the head part is movably engaged with the engaging part by a bayonet catch and can be moved relative to one another between a free position and a locked position, and wherein, in the locked position, the supporting portion covers the engaging body and blocks the engaging body from moving in translation along the longitudinal axis; and
wherein the threaded shank is received in the receptacle, and the engaging body engages with the shank.

10. An arrangement according to claim 9, and wherein the shank of the bolt-like element includes a thread and the engaging body engages with the thread of the shank.

11. A method for installing a fastening element, comprising the steps of:
providing a first workpiece partially defining a through hole;
providing a second workpiece having a connected bolt-like element (18) that includes a shank;
providing a fastening element comprising:
an engaging part comprising a bush and an engaging body that projects from the bush, and the bush extends along a longitudinal axis, and the engaging body projects radially inward in the direction of the longitudinal axis, and wherein the bush and the engaging body partially define a receptacle in which the shank of the bolt-like element can be received;
a head part, arranged above the engaging part, wherein the head part comprises a main body and a supporting portion; and
wherein the head part is movably engaged with the engaging part by a bayonet catch and can be moved relative to one another between a free position and a locked position, and wherein, in the locked position, the supporting portion covers the engaging body and blocks the engaging body from moving in translation along the longitudinal axis; and
penetrating the hole with the shank;
arranging the fastening element on the shank with the head part and engaging part in the free position;
pressing the fastening element onto the shank so that the engaging body engages with the shank; and
further pressing the fastening element onto the shank so that the head part moves, in order to set the head part and the engaging part into the locked position using the bayonet catch.

* * * * *